C. P. S. WARDWELL.
Planing-Machine.

No. 160,372.    Patented March 2, 1875.

Witnesses,

Inventor,
Charles P. S. Wardwell,
By his Attorney,
J. S. Brown

THE GRAPHIC CO. PHOTO-LITH. 39 & 41 PARK PLACE, N.Y.

UNITED STATES PATENT OFFICE.

CHARLES P. S. WARDWELL, OF LAKE VILLAGE, NEW HAMPSHIRE.

IMPROVEMENT IN PLANING-MACHINES.

Specification forming part of Letters Patent No. 160,372, dated March 2, 1875; application filed March 16, 1871.

*To all whom it may concern:*

Be it known that I, CHARLES P. S. WARDWELL, of Lake Village, in the county of Belknap and State of New Hampshire, have invented a new and useful Improvement in Planing-Machines; and I do hereby declare that the following is a full, clear, and exact description thereof, reference being had to the accompanying drawings, and to the letters of reference marked thereon.

The nature of my invention consists in an improved method of constructing the table of planing-machines for planing clapboards, whereby the thickness of the clapboard at either edge can be governed without materially altering the thickness of the other edge, and is an improvement on a patent for planing-machines granted to me January 14, 1862.

Figure 1:
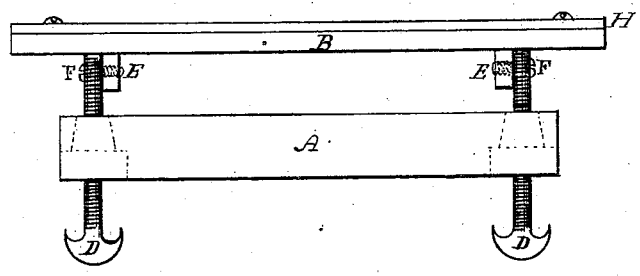
Figure 2:
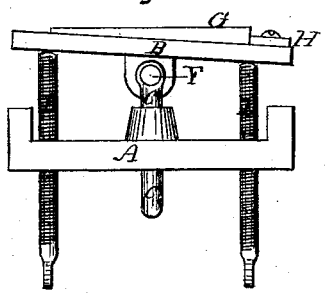

Figure 1 is a side view of the bed-piece and table, which may be applied to planing-machines in the ordinary manner. Fig. 2 is an end view of the same, showing a clapboard resting on the table.

To enable others skilled in the art to make and use my invention, I will proceed to describe its construction and operation.

A is a frame or bed, connected with which is an adjustable table, B, by means of two vertical guiding-rods, C C, one at each end of bed A, which pass down through corresponding holes in the bed A. These rods are pivoted to the table B by screws or pins F, passing through their upper ends into ears or projections E E on the under side of table B, thus allowing the table B a free movement on the pivots or pins. D D are thumb-screws, two on each side of the frame or bed A, which screw up through the bed A against the under side of table B, and upon the ends of which the table is supported. The guide-rods C C are only for the purpose of guiding and keeping the table B in its proper place in relation to bed A, both longitudinally and transversely, while allowing its vertical adjustment by means of screws D D.

Various plans may be employed for guiding and keeping the table in its proper place in relation to bed A—viz., the guide-rods may be dispensed with, and let the top ends of adjusting-screws D enter sockets on the under side of table B; or vertical studs may be attached to the corners, and enter notches in the table B; or guides may be applied in any suitable place or manner to accomplish the desired end; but I prefer the plan shown.

H is a gage to guide the clapboard properly through the machine while being planed. G represents a clapboard resting on the table while being planed.

This bed A and its table B may be substituted for the bed or frame E and its hinged bed-plates described in my Letters Patent before named, the width of the machine being adapted to the width of the bed herein described, this being a single machine, the patent named being for a double machine, to receive two clapboards at a time.

This bed and table may be used instead of, and applied in the same manner as, the beds of planing-machines in common use; or the bed A may be permanently attached to the frame a suitable distance below the revolving cutters, and the vertical adjustment of the table B made by the screws D.

I do not confine myself to the screws D as a means for adjusting the table B, as it may be done by inclined projections on the under side of the table and two sliding bars with corresponding inclined projections, as described in my said Letters Patent before named, except that each sliding bar—one for each side of the table—must be independent of the other, each operated by a thumb-screw.

The operation is as follows: Adjust the table B to the angle required for different tapers of clapboards by the screws D D, by which either side can be adjusted for the thickness required without materially affecting the thickness at the opposite side.

By my machine patented in 1862, before named, the thin edge of the clapboard cannot be graduated without correspondingly varying the thickness at both edges—a serious defect, which the present invention entirely obviates.

What I claim as my invention, and desire to secure by Letters Patent, is—

1. The table B, when provided with means for independently adjusting either of its edges, in order to vary the thickness of either edge of the clapboards without changing the thickness of the other edge thereof, substantially as herein specified.

2. The guide rods or pins C C, pivoted to the middle of the table B, and sliding in holes or ways in the bed A, for keeping the table in position without interfering with the independent adjustment of its edges, substantially as set forth.

C. P. S. WARDWELL.

Witnesses:
 JOHN ALDRICH,
 H. B. QUINBY.